United States Patent

Steinbach et al.

[11] Patent Number: 5,964,859
[45] Date of Patent: Oct. 12, 1999

[54] ALLOCATABLE POST AND PREFETCH BUFFERS FOR BUS BRIDGES

[75] Inventors: Andy Steinbach; Scott Swanstrom; Michael Wisor, all of Austin, Tex.

[73] Assignee: Advanced Micro Devices, Inc., Sunnyvale, Calif.

[21] Appl. No.: 08/960,819

[22] Filed: Oct. 30, 1997

[51] Int. Cl.⁶ .................................................. G06F 13/14
[52] U.S. Cl. ............................................. 710/129; 710/56
[58] Field of Search ..................................... 395/306, 308, 395/309, 872, 876; 710/126, 128, 129, 52, 56

[56] References Cited

U.S. PATENT DOCUMENTS

| 5,815,677 | 9/1998 | Goodrum | 395/306 |
| 5,859,988 | 1/1999 | Ajanovic et al. | 395/309 |

Primary Examiner—Glenn A. Auve
Attorney, Agent, or Firm—Conley, Rose & Tayon, PC; B. Noel Kivlin

[57] ABSTRACT

A computing system and bus bridge in which the bus bridge includes a buffer pool wherein the storage buffers contained in the buffer pool may be allocated as post buffers or fetch buffers in response to appropriate requests from the bus bridge. In the preferred embodiment, the bus bridge includes a buffer pool control unit adapted to temporarily allocate any of the plurality of storage buffers as either a post buffer or a fetch buffer depending upon the system requirements. Broadly speaking, the present invention contemplates a computing system including a first component connected to a first bus, a second component connected to a second bus, and a bus bridge connected to a first and second busses. The bus bridge includes a buffer pool comprised of a plurality of storage buffers and a buffer pool control unit that is capable of temporarily allocating at least one of the storage buffers as either a post buffer or a fetch buffer in response to system requirement. Preferably, each storage buffer includes corresponding tag information for identifying an origin or destination location within a main memory of the data associated with the storage buffer. In one embodiment, each of the plurality of storage buffers includes corresponding allocation information used by the buffer pool control unit for the temporary allocation of the storage buffers. In a presently preferred embodiment, the allocation information includes an available bit indicative of whether the storage buffers available for allocation and a post/fetch bit indicative of whether an unavailable storage buffer is currently allocated as a post buffer or as a fetch buffer. The allocation information is accessible by the buffer pool control unit and is used by the buffer pool control unit for temporarily allocating the storage buffers.

20 Claims, 3 Drawing Sheets

ND PREFETCH
ALLOCATABLE POST AND PREFETCH BUFFERS FOR BUS BRIDGES

BACKGROUND OF THE INVENTION

1. Field of the Invention

This invention relates to the field of computing systems and more particularly to a bus bridge including a buffer pool having a buffer storage location adapted to be configured as either a fetch buffer or a post buffer depending on the needs of the system.

2. Description of the Relevant Art

FIG. 1 is a block diagram of a conventional computer system 10 including a processing unit (CPU) 12, a CPU local bus 14 coupled to processing unit 12, and a first bridge 16. A system memory 18 and an external cache memory 19 are further shown coupled to first bridge 16. A first bus 20 is coupled to CPU local bus 14 through first bridge 16. In an exemplary embodiment, first bus 20 complies with, for example, the PCI bus protocol. A first peripheral device 22 is connected to first bridge 16 through first bus 20. First peripheral device 22 is exemplified by, for example, an SCSI hard disk controller or a high resolution graphics adapter.

Processing unit 12 is illustrative of, for example, an x86 processing unit, and CPU local bus 14 is exemplary of an x86-style local bus. The CPU local bus 14 typically includes a set of data lines D[31:0], a set of address lines A[31:0], and a set of control lines (not shown individually). Details regarding the various bus cycles and protocols of x86 CPU local bus 14 are described in a host of publications of the known prior art.

First bridge 16 provides a standard interface between CPU local bus 14 and first bus 20. As such, first bus bridge 16 orchestrates the transfer of data, address, and control signals between the two buses. First bridge 16 additionally provides an interface between CPU 12 and system memory 18, which is typically comprised of a relatively slow and dense memory device or devices such as an array of dynamic RAMS, as well as an interface between CPU 12 and external cache 19. External cache 19 is typically comprised of an array of higher speed but less dense (i.e. more costly) memory devices such as an array of static RAMs. The contents of recently accessed locations within system memory 18 are typically stored in external cache 19 (or in an internal cache within CPU 12) on the assumption that recently accessed memory locations are more likely to be accessed by CPU 12 than memory locations that have not been recently accessed. If CPU 12 issues a command to a memory location whose contents are currently stored in external cache 19, CPU 12 can typically access the contents of the location from external cache 19 faster than it could do so from system memory 18 thereby improving system performance. The capacity (in bytes) of system memory 18 is typically in the range of approximately $10^6$ to $10^7$ whereas the capacity of cache memory 19 is typically in the vicinity of $10^3$ to $10^4$ bytes. First bus 20 is a high performance peripheral bus such as a PCI bus that supports burst-mode data transfers and that includes multiplexed data/address lines. First peripheral device 28 is illustrative of, for example, any PCI compatible peripheral device such as a disk controller.

Bus bridges such as first bus bridge 16 facilitate the transfer of information between busses operating at different clock frequencies. To accomplish this task, bus bridges typically include buffers or storage locations for temporarily storing information in transit from one of the busses connected to the bridge to another bus connected to the bridge. These bus bridge buffers are typically classified as either "post" buffers or "fetch" buffers according to their function. Post buffers store information written by an initiating device connected to one side of a bridge and intended for a receiving device connected on the other side of the bridge. A common example of this type of sequence occurs when CPU 12 writes information to system memory 18. CPU obtains mastership of CPU local bus 14 and "posts" the information, comprising the data itself, the address of the storage location to which the information is destined, and a signal that alerts first bridge 16 to the presence of the information on the CPU local bus 14. When first bridge 16 is ready to receive the posted information, first bridge 16 will obtain mastership of the CPU local bus in response to the signal sent by CPU 12 and, once it has obtained mastership of the bus, typically store the address and data into an internal post buffer. After the information has been stored, first bridge 16 releases mastership of the CPU local bus 14. Eventually, first bridge 16 will transfer the information from the storage buffer to system memory 18 thereby freeing up the post buffer for receiving additional information.

Fetching or pre-fetching occurs when a bus bridge 16 determines that there is a likelihood that a device on one of the system busses may require the contents of a given storage location. In one common example, first bridge 16 may predict that CPU 12 will soon require the contents of a particular memory location. Such a prediction is most often made when, for example, CPU 12 requests the contents of an immediately preceding storage location within system memory 18. Because is reasonable to suspect that if CPU 12 requires the contents of location 0×N (where N is a hexadecimal representation of the storage location address) during the execution of a particular instruction, it will shortly require the contents of storage location 0×N+1, first bridge 16 may be configured to speculatively retrieve the contents of one or more storage locations whenever first bridge 16 determines that a requesting device has recently retrieved information from an adjacent or neighboring storage location. As will be appreciated to those skilled in the art of computing systems architecture, information retrieved in this fashioned is said to be "speculatively" fetched or pre-fetched because it is not a certainty that any of the system devices will require the pre-fetched information. In any event, the pre-fetched information is stored within a pre-fetch buffer or storage location of first bridge 16. If the pre-fetched information is ultimately required by a requesting device, system performance is improved because less time is required to deliver the information from first bridge 16 than from system memory 18.

Thus, the post and fetch buffers of conventional bus bridges are segregated in function. The available storage buffers are allocated between post buffers and fetch buffers in the hardware of the bus bridge. If the execution of a particular piece of code results in a disproportionate usage of either the post buffers or the fetch buffers, the bus bridge is incapable of accommodating the disproportionate demands by varying the number of buffers for reads and writes. It would therefore be desirable to achieve a bus bridge capable of adjusting the allocation of storage buffers as post buffers or fetch buffers according to the prevailing demands of the computing system.

SUMMARY OF THE INVENTION

The problems identified above are in large part solved by a computing system and bus bridge in which the bus bridge includes a buffer pool wherein the storage buffers contained in the buffer pool may be allocated as post buffers or fetch buffers in response to appropriate requests from the bus bridge. In the preferred embodiment, the bus bridge includes a buffer pool control unit adapted to temporarily allocate any of the plurality of storage buffers as either a post buffer or a fetch buffer depending upon the system requirements. In this manner, the bus bridge and the surrounding computing system can advantageously adapt to varying system demands while simultaneously minimizing duplication of unnecessary storage buffers.

Broadly speaking, the present invention contemplates a computing system. The computing system includes a first component connected to a first bus, a second component connected to a second bus, and a bus bridge connected to the first and second busses. The bus bridge facilitates the transmission of data between the first and second busses. The bus bridge includes a buffer pool comprised of a plurality of storage buffers. The bus bridge further includes a buffer pool control unit that is capable of temporarily allocating at least one of the storage buffers as either a post buffer or a fetch buffer depending on the requirements of the computing system. In this manner, a system with N storage buffers may be configured as N post buffers at a first point in time and may comprise N fetch buffers at another point in time. The flexibility allowed by the dynamically allocated storage buffers is a more efficient usage of system resources because the total number of buffers may be reduced. Preferably, the bus bridge further includes a first bus interface for communicating address data and control signals from the first bus to the buffer pool control unit and further includes a second bus interface for communicating address, data, and control signals from the second bus to the buffer pool control unit. Preferably, each storage buffer includes corresponding tag information for identifying an origin or destination location within a main memory of the data associated with the storage buffer. In one embodiment, each of the plurality of storage buffers includes corresponding allocation information used by the buffer pool control unit for the temporary allocation of the storage buffers. In a presently preferred embodiment, the allocation information includes an available bit indicative of whether the corresponding storage buffer is available for allocation and a post/fetch bit indicative of whether an unavailable storage buffer is currently allocated as a post buffer or as a fetch buffer. The allocation information is accessible by the buffer pool control unit and is used by the buffer pool control unit for temporarily allocating the storage buffers. Preferably, each of the buffers within the plurality of storage buffers is capable of being allocated as either a post buffer or as a fetch buffer. It is still further preferable that the buffer pool control unit is adapted to randomly access any of the plurality of storage buffers.

The present invention still further contemplates a bus bridge. The bus bridge includes a first bus interface, a second bus interface, a buffer pool, and a buffer pool control unit. The first bus interface is adapted to receive control, address, and data signals from a first bus device connected to a first bus. The second bus interface is adapted to receive control, address, and data signals from a second bus device connected to a second bus. The buffer pool includes a plurality of storage buffers. The buffer pool control unit is adapted to receive the information from the first and second bus interfaces and is further adapted to temporarily allocate each of the plurality of storage buffers as either a fetch buffer or a post buffer in response to the information from the first and second bus interfaces. Preferably, each of the plurality of storage buffer locations includes corresponding tag information for identifying an originating or destination location within a system main memory of the data stored in the storage buffer. Each of the storage buffers preferably includes corresponding allocation information used by the buffer pool control unit for the temporary allocation of the storage buffers. The allocation information preferably includes an available/unavailable bit indicative of whether the storage buffer is available for allocation as well as a post/fetch bit indicative of whether an unavailable storage buffer is currently allocated as a post buffer or as a fetch buffer. The buffer pool control unit utilizes the allocation information to perform the temporary allocation of the storage buffers.

The present invention still further contemplates a computing system comprising a central processing unit, an integrated bus bridge interfaced to the CPU via a CPU local bus. A system main memory, typically comprised of a plurality of dynamic RAMs is connected to and controlled by the integrated bus bridge. The system further includes an external cache memory, typically comprised of a plurality of static RAMS, interfaced to the integrated bus bridge. A first peripheral device is connected to the integrated bus bridge via a first bus. The integrated bus bridge includes a buffer pool. The buffer pool includes a plurality of storage buffers. The bus bridge further includes a buffer pool control unit configured to temporarily allocate any of the plurality of storage buffers as either a post buffer or a fetch buffer whereby the number of post and fetch buffers. In this manner, the number of post and fetch buffers within the integrated bus bridge may vary with time in response to existing requirements of the computing system. In one embodiment, the first bus conforms to a PCI, ISA or EISA bus protocol. In one embodiment, the system further includes a second bus bridge that is connected to the integrated bus bridge over the first bus. The second bus bridge is connected to a second peripheral device connected to the second bus. Ideally, the storage buffers in the integrated bus bridge each include corresponding tag information and corresponding allocation information that is used by the buffer pool control unit for the temporary allocation of the storage unit. In one embodiment, the buffer pool control unit is capable of randomly accessing each of the plurality of storage buffers within the buffer pool.

BRIEF DESCRIPTION OF THE DRAWINGS

Other objects and advantages of the invention will become apparent upon reading the following detailed description and upon reference to the accompanying drawings in which.

Figure 2:
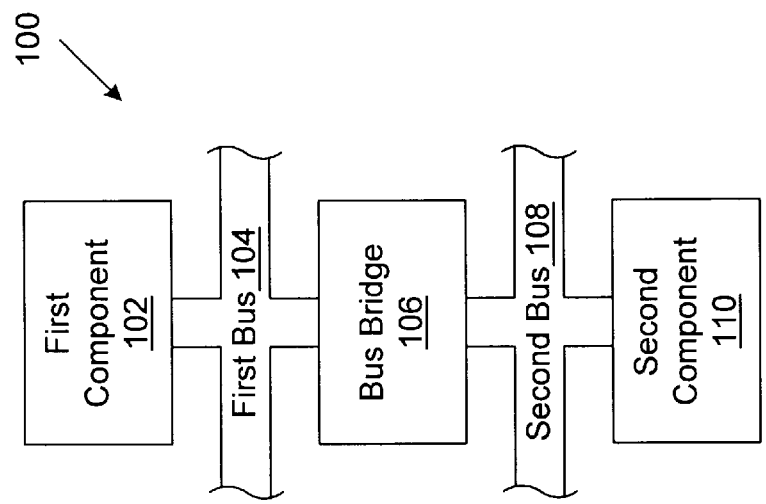
FIG. 2 is a block diagram of selected features of a computing system including a bus bridge according to the present invention.
Figure 1:
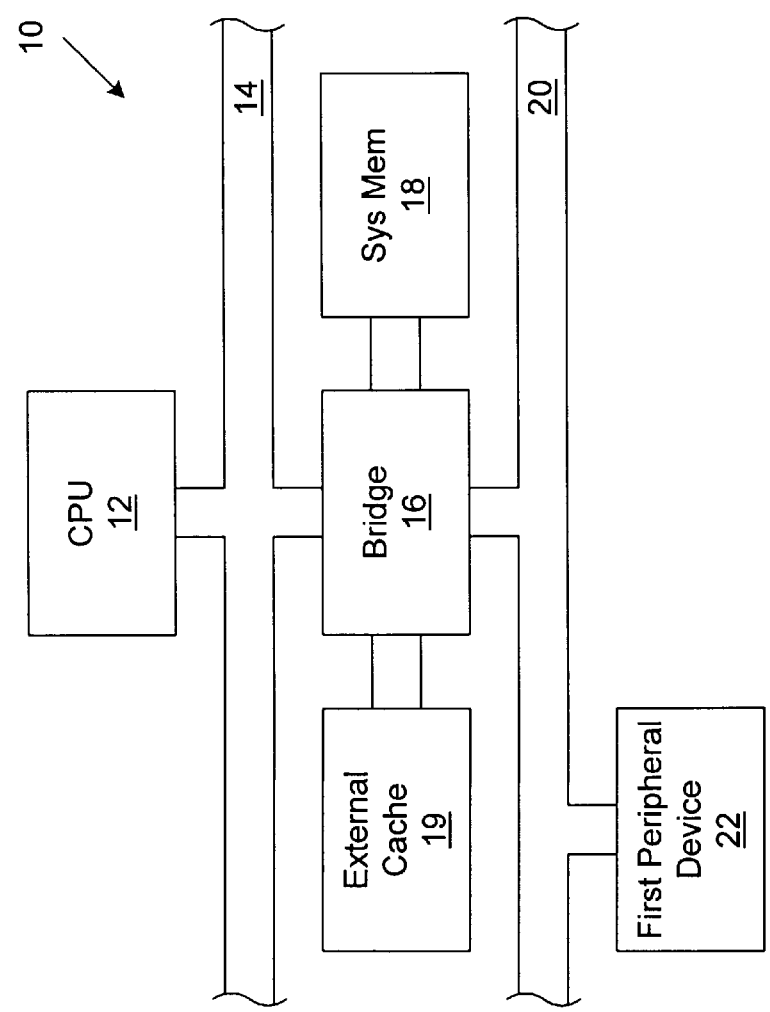
FIG. 1 is a block diagram of selected features of a computing system according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

Turning now to the drawings, FIG. 2 is a block diagram representation of selected features of a computing system 100. Computing system 100 includes a first component 102 connected to a first bus 104. A second component 110 is connected to a second bus 108. A bus bridge 106 is connected to first bus 104 and second bus 108. It will be appreciated to those skilled in the art that first bus 104 and second bus 108 may, in certain embodiments, operate at different speeds or frequencies. When this is the case, a bridge such as bus bridge 106 facilitates the transmission of data between first bus 104 and second bus 108. Typically, this facilitation of interbus communication is accomplished by designing bridge 106 with a first port (not shown in FIG. 2) and a second port for interfacing with second bus 108. The dedicated ports are typically combined with a buffer facility for temporarily storing information in transit between the two busses. In such an embodiment, the first port of bus bridge 106 can operate at the frequency of first bus 104 while the second port operates at the frequency of second bus 108 and the buffer pool is useful for providing a temporary storage location. In one embodiment, first component 102 comprises a central processing unit such as an x86 type central processing unit and second component 110 comprises a system memory. In this embodiment, it will be appreciated that first bus 104 is a CPU local bus while second bus 108 comprises a memory bus. In another embodiment, first component 102 comprises an x86 type processor, first bus 104 comprises a CPU local bus, second bus 108 is compatible with any of several industry standard bus interface architectures such as the PCI, ISA, or EISA protocols. In an embodiment in which second bus 108 comprises a PCI bus, second component 110 may comprise, for example, an SCSI hard disk controller coupled to PCI bus 108 through an SCSI adapter (not shown in FIG. 2), or other appropriate PCI device such as, for example, a graphics adapter.

Figure 3:
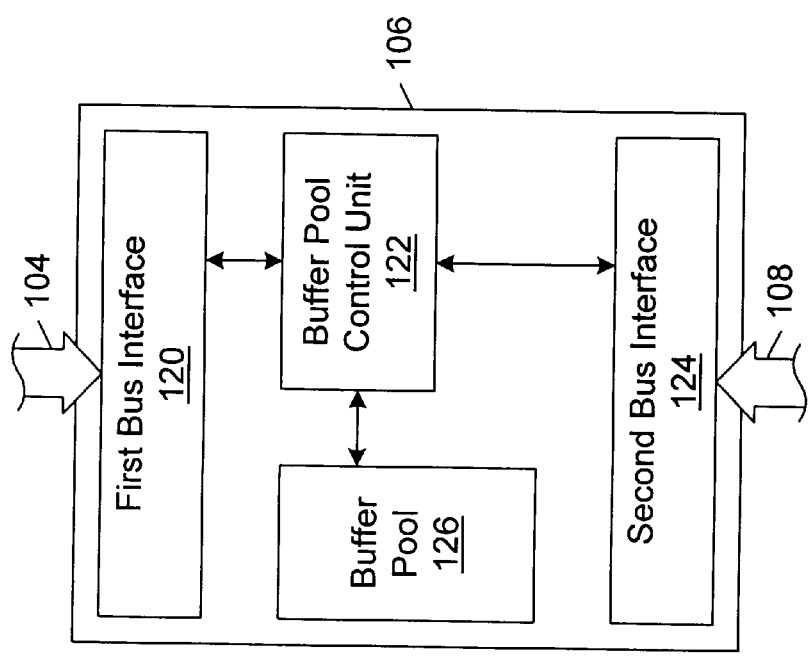
FIG. 3 is a block diagram identifying selected features of the bus bridge of FIG. 2.

Turning now to FIG. 3, further details regarding bus bridge 106 according to the present invention are shown. In the presently preferred embodiment, bus bridge 106 includes a first bus interface 120, a second bus interface 124, a buffer pool 126, and a buffer pool control unit 122. Buffer pool control unit 122 is interfaced to and receives information from first bus interface 120 and second bus interface 124. The respective bus interfaces receive information including address, data, and control information from the respective busses and route the required information to buffer pool control unit 122. Buffer pool control unit 122 is further interfaced to the buffer pool 126. As will be discussed in greater detail below, buffer pool 126 includes a plurality of storage buffers for temporarily storing information posted to or fetched from first bus 104 or second bus 108. Buffer pool control unit 122 is capable of temporarily allocating at least one of the plurality of storage buffers within buffer pool 126 as either a post buffer or a fetch buffer according to the prevailing requirements. If, for example, a segment of software code is executing that requires a relatively high percentage of post buffers, buffer pool control unit 122 can accommodate this requirement by allocating storage buffers within buffer pool 126 as post buffers. In one embodiment, each of the plurality of storage buffers within buffer pool 126 is capable of being allocated as either a post buffer or a fetch buffer by buffer pool control unit 122. This embodiment allows maximum flexibility in adjusting the ratio of post buffers to fetch buffers to accommodate the demands placed upon the bus bridge by the surrounding computing system.

Figure 4:
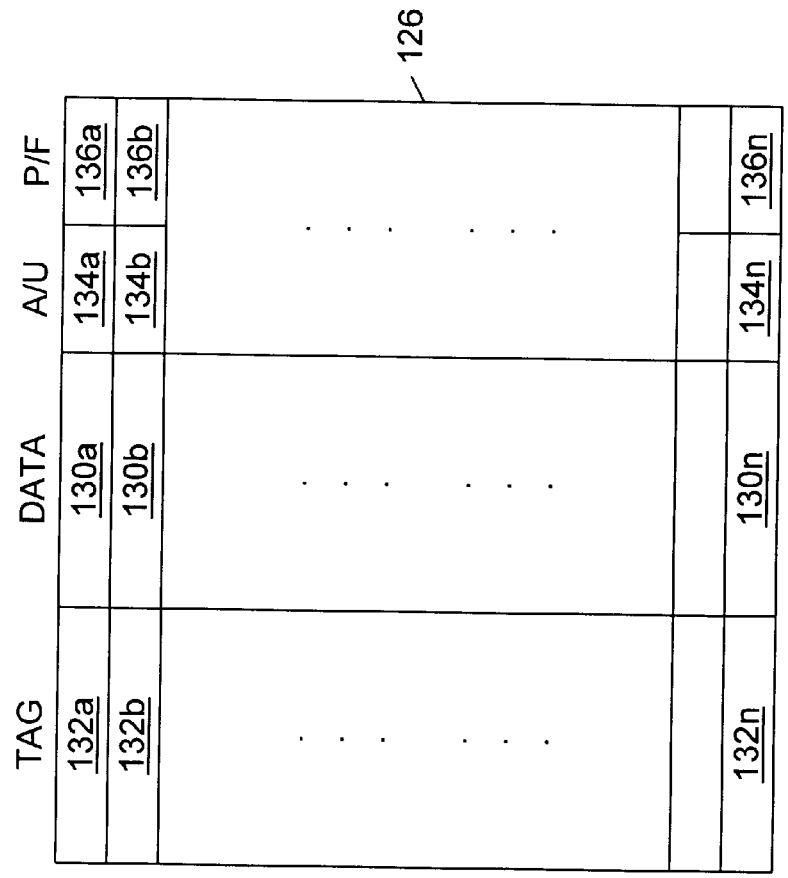
FIG. 4 is a block representation of one embodiment of a buffer pool including a plurality of storage buffers; and, FIG. 5 is a block diagram of selected features of a computing system including a bridge according to the present invention.

Turning now to FIG. 4, one embodiment of buffer pool 126 is described in greater detail. In the embodiment shown in FIG. 4, buffer pool 126 includes a plurality of storage buffers 130a, 130b, . . . , 130n (collectively referred to as storage buffers 130). Each of the plurality of storage buffers 130 is a storage location capable of saving information until it is used or otherwise retired by buffer pool control unit 122. In one embodiment, each control buffer 130 includes 32 or 64 bits of information in conformity with the bit size of instruction operands in many conventional microprocessor architectures including, for example, an x86 type architecture. In another embodiment, each storage buffer 130 may include entire lines of information where a line is defined for purposes of this disclosure, as the information contained in a predetermined number of sequential address locations. In a presently preferred embodiment, each storage buffer 130 has an associated piece of tag information represented in FIG. 4 by reference numeral 132a. The tag information identifies the originating or destination location within a system memory of an associated computing system to which or from which the corresponding data within storage buffer 130 is associated. In an embodiment in which storage buffers 130 contain only the information from one address location of the system memory, the tag information may suitably include enough bits to uniquely identify a storage location within a system memory. If, for example, the operating system and the microprocessor architecture utilize a 32 bit addressing scheme, tag information 132 may require 32 bits of information to uniquely identify a storage location associated with the data in the corresponding storage buffer 130. If, on the other hand, storage buffers 130 are capable of saving information stored in multiple locations within the system memory, tag information 132 may not require a full address to uniquely identify the location within the system memory associated with the data in the corresponding storage buffer 130. If, for example, each storage buffer 130 contains information from consecutive storage locations from the system memory, the lower two bits of the tag identification information 132 can be ignored and utilized for other purposes assuming that the operating software ensures that the data within each storage buffer 130 is appropriately aligned. It will be further appreciated to those skilled in the architecture and design of conventional cache memories that tag identifiers 132 may be designed in a set associative manner such that even fewer tag identifier bits are required to uniquely identify the originating or destination system memory location.

In a presently preferred embodiment, each storage buffer 130 is still further associated with allocation information represented in FIG. 4 by the available/unavailable information 134 and the post/fetch information 136. In one embodiment, buffer pool control unit 122 may determine whether one of the storage buffers is available for allocation by examining the corresponding available/unavailable field, suitably comprised of one bit in a presently preferred embodiment. If the available/unavailable field indicates that the corresponding storage buffer 130 is unavailable, then the buffer pool control unit will sequence for an available storage buffer according to any number of search algorithyms. In the embodiment shown in FIG. 4, each storage buffer 130 is adapted to be configured as either a post buffer or a fetch buffer by buffer pool control unit 122. To record the current allocation of any of the storage buffers 130, the allocation information further includes in the presently preferred embodiment a post/fetch field identified in FIG. 4 by a reference numerals 136a, 136b, . . . , 136n. Post/fetch information 136 is suitably comprised of a single bit indicative of whether the corresponding storage buffer 130 is currently allocated as a post buffer or as a fetch buffer. This information may be useful as buffer pool control unit 122 in reducing the number of storage buffer locations control unit 122 would have to search when trying to find posted or fetched information stored within buffer pool 126. In the most flexible embodiment of the buffer pool 126 shown in FIG. 4, buffer pool control unit 122 is adapted to be able to randomly access any of the storage buffers 130. Random accessing of the storage buffer, coupled with the necessary allocation information and tag identification information, permits the implementation of any preferred search or allocation algorithm that the designer requires. In an alternative embodiment designed to potentially reduce the amount of circuitry required by buffer pool control unit 122, buffer pool control unit may operate in a sequential mode. In one such sequential embodiment, buffer control unit 122 may include first and second storage buffer pointers. The first and second pointers point to the next available post and fetch buffer respectively. In one embodiment, the first pointer is initialized to point to the lowest or first storage buffer 130a while the second pointer is initialized to point to the highest or last storage buffer 130n. As post and fetch buffers are allocated, the appropriate pointers are incremented to point to the next available post or fetch buffer. Buffer pool control unit 122 would require circuitry designed to recognize whenever the two pointers overlap to avoid a situation in which a currently allocated post buffer is reallocated as a fetch buffer without properly handling the posted information. The buffer pool control unit 122 would further require circuitry to recognize when a previously allocated storage buffer is no longer required either because the data has been transmitted to the receiving destination or it has been subsequently determined that the information is no longer needed. The common example of the latter situation includes retiring speculatively fetched information after determining that the information will not be required. Despite the complexities posed by these specific scenarios, a sequential allocation method may, nevertheless, offer reduced circuit complexity and improved performance over a randomly accessible embodiment of buffer pool 126.

Figure 5:
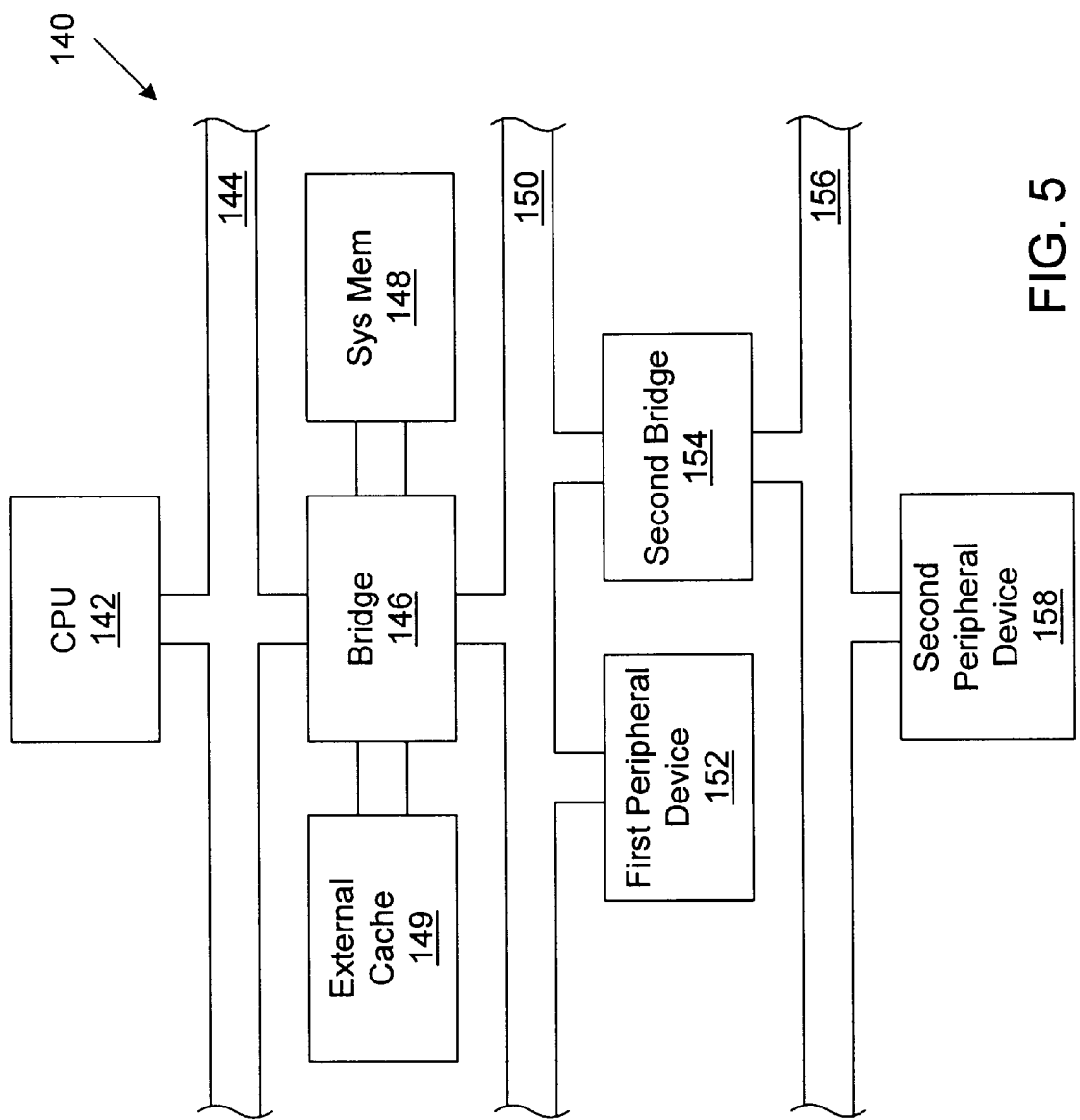

Turning now to FIG. 5, a computing system 140 is shown including a bridge 106 according to the present invention. Computing system 140 includes a CPU 142 interfaced to a CPU local bus 144. In the preferred embodiment, CPU 142 is representative of, for example, an x86 microprocessor or a suitable RISC processor. CPU local bus 144 controls the flow of address, data, and control information to and from CPU 142. Bridge 146 as shown in FIG. 5 is an integrated bus bridge which includes a memory controller and interface to system memory 148 as well as an external cache interface for communicating with external cache 149. System memory 148 comprises a relatively large storage facility typically implemented with low costs and highly dense memory components such as dynamic RAMs. External cache 149, on the other hand, is a relatively small storage facility typically implemented with high speed and lower density memory components such as static RAMs. External cache 149 provides an overall system efficiency under the theory that a relatively small portion of the system memory is likely to be reused on CPU 142 once it has been initially accessed. It makes sense, therefore, to store this smaller portion of the system memory in a higher speed memory facility such as external cache 149. Integrated bus bridge 146 further includes an interface to a second bus 150. In the preferred embodiment, second bus 150 complies with the PCI bus interface protocol. A first peripheral device 152 is shown as attached an interfaced to integrated bus bridge 146 over PCI bus 150. First peripheral device 152 is representative of any number of PCI devices including, for example, an SCSI hard disc controller (coupled with an SCSI adapter, not shown in the figure) or a high performance graphics adapter. A second bridge 154 is shown as connected to PCI bus 150. Second bridge 154 provides a gate way to a second bridge 156. In the preferred embodiment, the second bridge 156 complies with an ISA architecture. Accordingly, the second peripheral device 158 contemplates a relatively low performance peripheral device such as an audio card or a fax/modem. Integrated bus bridge 146 includes the features shown with respect to bus bridge 106 in FIG. 3. More specifically, integrated bus bridge 146 includes a buffer pool similar to buffer pool 126 and a buffer pool control unit similar to buffer pool control unit 122 adapted to temporarily allocate any of the plurality of storage buffers within the buffer pool as either a post or fetch buffer depending on the requirements of the system. It will be appreciated that in addition to integrated bus bridge 146, computing system 140 may incorporate allocatable post/fetch buffers into second bridge 154. In such an embodiment, second bridge 154 may include a buffer pool control unit to allocate any of the plurality of storage buffers within second bridge 154 as a post or fetch buffer according to signals received by second bridge 154 over PCI bus 150 or ISA bus 156.

It will be appreciated to those skilled in the art that the present invention contemplates efficient resource usage within a bus bridge by enabling dynamic allocation of the available storage buffers as either post buffers or fetch buffers. Various modifications and changes may be made to each and every processing step as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computing system, comprising
    a first component connected to a first bus;
    a second component connected to a second bus;
    a bus bridge connected to said first and second busses wherein said bus bridge facilitates transmittal of data between said first and second busses, and wherein said bus bridge includes a buffer pool comprising a plurality of storage buffers, and further wherein said bus bridge includes a buffer pool control unit capable of temporarily allocating at least one of said plurality of buffers as either a post buffer or as a fetch buffer depending upon the requirements of said computing system.

2. The computing system of claim 1, wherein said bus bridge further includes:
    a first bus interface for communicating address, data, and control signals from said first bus to said buffer pool control unit; and
    a second bus interface for communicating address, data, and control signals from said second bus to said buffer pool control unit.

3. The computing system of claim 1, wherein each said storage buffer includes corresponding tag information for identifying an origin or destination location within a main memory of the data associated with said storage buffer.

4. The computing system of claim 1, wherein each of said plurality of storage buffer locations includes corresponding allocation information used by said buffer pool control unit for said temporary allocation of said storage buffers.

5. The computing system of claim 4, wherein said allocation information includes an available bit indicative of whether said storage buffer is available for allocation and a post/fetch bit indicative of whether an unavailable storage buffer is currently allocated as a post buffer or as a fetch buffer and wherein allocation information is accessible by said buffer pool control unit during said temporary allocation.

6. The computing system of claim 1, wherein said buffer pool control unit is capable of temporarily allocating any of said plurality of storage buffers as either a post buffer or as a fetch buffer.

7. The computing system of claim 6, wherein said buffer pool control unit is adapted to randomly access any of said plurality of storage buffers.

8. The computing system of claim 1, wherein said first component comprises a processing unit and wherein said second component comprises a system memory.

9. The computing system of claim 1, wherein said first bus comprises a CPU local bus and said second bus comprises a PCI ISA, or EISA bus.

10. A bus bridge, comprising:
 a first bus interface, wherein said first bus interface is adapted to receive control, address, and data signals from a first bus device connected to a first bus;
 a second bus interface, wherein said second bus interface is adapted to receive control, address, and data signals from a second bus device connected to a second bus;
 a buffer pool comprising a plurality of storage buffers; and
 a buffer pool control unit adapted to receive information from said first and second bus interfaces and further adapted to temporarily allocate each of said plurality of storage buffers as either a fetch buffer or a post buffer in response to said information from said first and second bus interfaces.

11. The bridge of claim 10, wherein each of said plurality of storage buffers includes corresponding tag information for identifying an originating or destination location within a system main memory for data stored in said each of said plurality of storage buffers.

12. The bridge of claim 10, wherein each of said plurality of storage buffers includes corresponding allocation information used by said buffer pool control unit for said temporary allocation of said plurality of storage buffers.

13. The bridge of claim 12, wherein said allocation information includes an available/unavailable bit indicative of whether each of said plurality of storage buffers is available for allocation and a post/fetch bit indicative of whether an unavailable storage buffers is currently allocated as a post buffer or as a fetch buffer and wherein said buffer pool control unit utilizes said allocation information to perform said temporary allocation.

14. A computing system comprising:
 a central processing unit;
 an integrated bus bridge interfaced to said CPU via a CPU local bus;
 a system memory comprising a plurality of dynamic RAM storage locations connected to and controlled by said integrated bus bridge;
 an external cache memory comprising a plurality of static RAM storage locations interfaced to said integrated bus bridge;
 a first peripheral device connected to said integrated bus bridge via a first bus; and
 wherein said integrated bus bridge includes a buffer pool comprising a plurality of storage buffers, and further wherein said bus bridge includes a buffer pool control unit configured to temporarily allocate any of said plurality of said buffers as either a post buffer or a fetch buffer whereby the number of post and fetch buffers within said integrated bus bridge may vary with time in response to existing requirements of said computing system.

15. The system of claim 14, wherein said first bus conforms to a PCI, ISA, or EISA bus protocol.

16. The system of claim 14, further comprising a second bus bridge connected to said integrated bus bridge over said first bus, and wherein said second bus bridge is connected to a second peripheral device connected to a second bus.

17. The system of claim 14, wherein each of said plurality of storage buffers includes corresponding tag information for identifying an origin or destination location within said main memory corresponding to data stored in said storage buffer.

18. The computing system of claim 14, wherein each of said plurality of storage buffer location includes corresponding allocation information used by said buffer pool control unit for said temporary allocation.

19. The computing system of claim 18, wherein said allocation information includes an available/unavailable bit indicative of whether said storage buffer is available for allocation and a post/fetch bit indicative of whether an unavailable storage buffer is currently allocated as a post buffer or as a fetch buffer and wherein said allocation information is accessible by said buffer pool control unit during said temporary allocation.

20. The computing system of claim 14, wherein buffer pool control unit is capable of randomly accessing said plurality of storage buffers.

* * * * *